United States Patent
Root et al.

(10) Patent No.: US 9,554,246 B2
(45) Date of Patent: *Jan. 24, 2017

(54) INTERACTIVE WEATHER ADVISORY SYSTEM

(71) Applicant: LOCATOR IP, L.P., State College, PA (US)

(72) Inventors: Steven A. Root, Edmond, OK (US); Michael R. Root, Edmond, OK (US)

(73) Assignee: Locator IP, LP, State College, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/872,909

(22) Filed: Oct. 1, 2015

(65) Prior Publication Data

US 2016/0057568 A1 Feb. 25, 2016

Related U.S. Application Data

(63) Continuation of application No. 14/801,555, filed on Jul. 16, 2015, which is a continuation of application
(Continued)

(51) Int. Cl.
*G06F 17/30* (2006.01)
*H04W 4/02* (2009.01)
(Continued)

(52) U.S. Cl.
CPC ............. *H04W 4/02* (2013.01); *G01W 1/00* (2013.01); *G01W 1/02* (2013.01); *G06F 17/3087* (2013.01);
(Continued)

(58) Field of Classification Search
CPC ................................................ G06F 17/30091
(Continued)

(56) References Cited

U.S. PATENT DOCUMENTS 3,596,264 A 7/1971 Ciemochowski
3,891,979 A 6/1975 Braun et al.
(Continued)

FOREIGN PATENT DOCUMENTS

AU 2001277030 B2 3/2006
AU 2006204945 A1 7/2006
(Continued)

OTHER PUBLICATIONS

Boselly, III, Edward, et al., "Road Weather Information Systems vol. 2: Implementation Guide," 1993, pp. 1-82.
(Continued)

*Primary Examiner* — Noosha Arjomandi
(74) *Attorney, Agent, or Firm* — Blank Rome LLP (57) ABSTRACT

A method for providing information to a plurality of vendors located remotely from a broadcast network. A plurality of user-defined parameters are received by a user input database with at least one of the user-defined parameters including a user profile. Each of the user profiles includes a user identifier code identifying a communicator device associated with a particular user. Real-time data indicative of the spatial locations of the communicator devices is received by a communicator location database. Search information is received independently from a plurality of vendors and a data set is generated for each vendor.

26 Claims, 2 Drawing Sheets

Related U.S. Application Data

No. 14/156,103, filed on Jan. 15, 2014, now Pat. No. 9,197,990, which is a continuation of application No. 10/965,088, filed on Oct. 14, 2004, now Pat. No. 8,909,679, which is a continuation of application No. 10/667,108, filed on Sep. 19, 2003, now Pat. No. 6,826,481, which is a continuation of application No. 10/322,187, filed on Dec. 16, 2002, now Pat. No. 6,754,585, which is a continuation of application No. 09/624,668, filed on Jul. 24, 2000, now Pat. No. 6,505,123.

(51) Int. Cl.
  *G01W 1/00* (2006.01)
  *H04L 12/18* (2006.01)
  *H04W 4/20* (2009.01)
  *H04L 29/08* (2006.01)
  *G06Q 30/02* (2012.01)
  *G01W 1/02* (2006.01)
  *H04W 88/02* (2009.01)

(52) U.S. Cl.
  CPC ... *G06F 17/30241* (2013.01); *G06F 17/30876* (2013.01); *G06Q 30/0256* (2013.01); *H04L 12/1845* (2013.01); *H04L 12/1859* (2013.01); *H04L 12/1877* (2013.01); *H04L 12/1895* (2013.01); *H04L 67/04* (2013.01); *H04L 67/18* (2013.01); *H04L 67/20* (2013.01); *H04L 67/306* (2013.01); *H04L 69/329* (2013.01); *H04W 4/20* (2013.01); *H04L 12/189* (2013.01); *H04W 88/02* (2013.01)

(58) Field of Classification Search
  USPC ......................................................... 707/791
  See application file for complete search history.

(56) References Cited

U.S. PATENT DOCUMENTS

| | | |
|---|---|---|
| 4,015,366 A | 4/1977 | Hall, III |
| 4,222,044 A | 9/1980 | Boschung |
| 4,438,439 A | 3/1984 | Shreve |
| 4,459,682 A | 7/1984 | Mossberg |
| 4,473,844 A | 9/1984 | Klein |
| 4,521,857 A | 6/1985 | Reynolds, III |
| 4,529,982 A | 7/1985 | Karlstrom et al. |
| 4,577,109 A | 3/1986 | Hirschfeld |
| 4,586,827 A | 5/1986 | Hirsch et al. |
| 4,755,942 A | 7/1988 | Gardner et al. |
| 4,774,658 A | 9/1988 | Lewin |
| 4,845,629 A | 7/1989 | Murga |
| 4,892,335 A | 1/1990 | Taft |
| 4,901,300 A | 2/1990 | Van Der Zande et al. |
| 4,945,355 A | 7/1990 | Blanchette |
| 4,972,319 A | 11/1990 | Delorme |
| 5,086,394 A | 2/1992 | Shapira |
| 5,111,111 A | 5/1992 | Stevens et al. |
| 5,111,391 A | 5/1992 | Fields et al. |
| 5,117,353 A | 5/1992 | Stipanovich et al. |
| 5,122,959 A | 6/1992 | Nathanson et al. |
| 5,131,020 A | 7/1992 | Liebesny et al. |
| 5,164,904 A | 11/1992 | Sumner |
| 5,193,143 A | 3/1993 | Kaemmerer |
| 5,206,903 A | 4/1993 | Kohler et al. |
| 5,214,757 A | 5/1993 | Mauney et al. |
| 5,214,793 A | 5/1993 | Conway et al. |
| 5,229,975 A | 7/1993 | Truesdell et al. |
| 5,250,955 A | 10/1993 | Major et al. |
| 5,265,024 A | 11/1993 | Crabill et al. |
| 5,298,760 A | 3/1994 | Fuchs et al. |
| 5,365,290 A | 11/1994 | Suzuki et al. |
| 5,398,021 A | 3/1995 | Moore |
| 5,416,694 A | 5/1995 | Parrish et al. |
| 5,432,509 A | 7/1995 | Kajiwara |
| 5,434,565 A | 7/1995 | Simon et al. |
| 5,442,147 A | 8/1995 | Burns et al. |
| 5,444,444 A | 8/1995 | Ross |
| 5,448,696 A | 9/1995 | Shimada et al. |
| 5,467,268 A | 11/1995 | Sisley et al. |
| 5,481,254 A | 1/1996 | Gaskill et al. |
| 5,486,830 A | 1/1996 | Axline, Jr. et al. |
| 5,488,697 A | 1/1996 | Kaemmerer |
| 5,493,709 A | 2/1996 | Duckeck et al. |
| 5,528,678 A | 6/1996 | Kaplan |
| 5,544,140 A | 8/1996 | Seagrave et al. |
| 5,550,981 A | 8/1996 | Bauer et al. |
| 5,555,446 A | 9/1996 | Jasinski |
| 5,565,863 A | 10/1996 | Simon et al. |
| 5,606,699 A | 2/1997 | De Pauw et al. |
| 5,607,187 A | 3/1997 | Salive et al. |
| 5,615,121 A | 3/1997 | Babayev et al. |
| 5,615,223 A | 3/1997 | Carr |
| 5,615,400 A | 3/1997 | Cowsar et al. |
| 5,628,050 A | 5/1997 | McGraw et al. |
| 5,629,854 A | 5/1997 | Schulte |
| 5,634,057 A | 5/1997 | Dickinson |
| 5,642,303 A | 6/1997 | Small et al. |
| 5,649,182 A | 7/1997 | Reitz |
| 5,671,412 A | 9/1997 | Christiano |
| 5,684,476 A | 11/1997 | Anderson |
| 5,689,650 A | 11/1997 | McClelland et al. |
| 5,703,930 A | 12/1997 | Miska et al. |
| 5,706,505 A | 1/1998 | Fraley et al. |
| 5,717,589 A | 2/1998 | Thompson et al. |
| 5,725,253 A | 3/1998 | Salive et al. |
| 5,754,782 A | 5/1998 | Masada |
| 5,757,322 A | 5/1998 | Ray et al. |
| 5,764,906 A | 6/1998 | Edelstein et al. |
| 5,768,577 A | 6/1998 | Kleewein et al. |
| 5,790,664 A | 8/1998 | Coley et al. |
| 5,790,953 A | 8/1998 | Wang et al. |
| 5,794,234 A | 8/1998 | Church et al. |
| 5,819,227 A | 10/1998 | Obuchi |
| 5,828,843 A | 10/1998 | Grimm et al. |
| 5,839,088 A | 11/1998 | Hancock et al. |
| 5,845,276 A | 12/1998 | Emerson et al. |
| 5,848,131 A | 12/1998 | Shaffer et al. |
| 5,848,373 A * | 12/1998 | DeLorme ............... G01C 21/20 340/990 |
| 5,848,378 A | 12/1998 | Shelton et al. |
| 5,864,860 A | 1/1999 | Holmes |
| 5,864,875 A | 1/1999 | Van Huben et al. |
| 5,867,109 A | 2/1999 | Wiedeman |
| 5,867,110 A | 2/1999 | Naito et al. |
| 5,867,821 A | 2/1999 | Ballantyne et al. |
| 5,880,958 A | 3/1999 | Helms et al. |
| 5,884,267 A | 3/1999 | Goldenthal et al. |
| 5,884,309 A | 3/1999 | Vanechanos, Jr. |
| 5,892,917 A | 4/1999 | Myerson |
| 5,893,905 A | 4/1999 | Main et al. |
| 5,898,680 A | 4/1999 | Johnstone et al. |
| 5,913,201 A | 6/1999 | Kocur |
| 5,948,041 A | 9/1999 | Abo et al. |
| 5,950,161 A | 9/1999 | Kozuma et al. |
| 5,963,130 A | 10/1999 | Schlager et al. |
| 5,970,143 A * | 10/1999 | Schneier ............... A63F 13/71 380/251 |
| 5,974,447 A | 10/1999 | Cannon et al. |
| 5,978,730 A | 11/1999 | Poppen et al. |
| 5,982,860 A | 11/1999 | Kim |
| 5,991,735 A | 11/1999 | Gerace |
| 5,999,126 A | 12/1999 | Ito |
| 5,999,882 A | 12/1999 | Simpson et al. |
| 6,000,285 A | 12/1999 | Leslie et al. |
| 6,014,090 A | 1/2000 | Rosen et al. |
| 6,018,699 A | 1/2000 | Baron, Sr. et al. |
| 6,021,432 A | 2/2000 | Sizer, II et al. |
| 6,023,223 A | 2/2000 | Baxter, Jr. |
| 6,023,765 A | 2/2000 | Kuhn |
| 6,028,514 A | 2/2000 | Lemelson et al. |

(56) References Cited

U.S. PATENT DOCUMENTS

| | | | |
|---|---|---|---|
| 6,028,537 A * | 2/2000 | Suman | B60K 35/00 340/426.14 |
| 6,031,455 A | 2/2000 | Grube et al. | |
| 6,040,781 A | 3/2000 | Murray | |
| 6,043,756 A | 3/2000 | Bateman et al. | |
| 6,047,236 A | 4/2000 | Hancock et al. | |
| 6,047,327 A | 4/2000 | Tso et al. | |
| 6,049,776 A | 4/2000 | Donnelly et al. | |
| 6,054,950 A | 4/2000 | Fontana | |
| 6,055,434 A | 4/2000 | Seraj | |
| 6,070,142 A | 5/2000 | McDonough et al. | |
| 6,070,143 A | 5/2000 | Barney et al. | |
| 6,078,260 A | 6/2000 | Desch | |
| 6,084,510 A | 7/2000 | Lemelson et al. | |
| 6,088,679 A | 7/2000 | Barkley | |
| 6,091,956 A | 7/2000 | Hollenberg | |
| 6,091,959 A | 7/2000 | Souissi et al. | |
| 6,094,509 A | 7/2000 | Zheng et al. | |
| 6,098,048 A | 8/2000 | Dashefsky et al. | |
| 6,100,806 A | 8/2000 | Gaukel | |
| 6,101,443 A | 8/2000 | Kato et al. | |
| 6,108,699 A | 8/2000 | Moiin | |
| 6,112,074 A | 8/2000 | Pinder | |
| 6,112,075 A | 8/2000 | Weiser | |
| 6,133,853 A | 10/2000 | Obradovich et al. | |
| 6,133,912 A | 10/2000 | Montero | |
| 6,134,530 A | 10/2000 | Bunting et al. | |
| 6,138,073 A | 10/2000 | Uchigaki | |
| 6,144,739 A | 11/2000 | Witt et al. | |
| 6,148,261 A | 11/2000 | Obradovich et al. | |
| 6,161,092 A | 12/2000 | Latshaw et al. | |
| 6,167,255 A | 12/2000 | Kennedy, III et al. | |
| 6,177,873 B1 | 1/2001 | Cragun | |
| 6,181,260 B1 | 1/2001 | Simon et al. | |
| 6,185,427 B1 | 2/2001 | Krasner et al. | |
| 6,199,045 B1 | 3/2001 | Giniger et al. | |
| 6,202,023 B1 | 3/2001 | Hancock et al. | |
| 6,204,761 B1 | 3/2001 | Vanderable | |
| 6,209,026 B1 | 3/2001 | Ran et al. | |
| 6,212,393 B1 | 4/2001 | Suarez et al. | |
| 6,219,667 B1 | 4/2001 | Lu et al. | |
| 6,231,519 B1 | 5/2001 | Blants et al. | |
| 6,233,122 B1 | 5/2001 | Summers | |
| 6,234,580 B1 * | 5/2001 | Muraoka | B60B 1/0223 301/55 |
| 6,240,369 B1 | 5/2001 | Foust | |
| 6,252,539 B1 | 6/2001 | Phillips et al. | |
| 6,252,544 B1 | 6/2001 | Hoffberg | |
| 6,255,953 B1 | 7/2001 | Barber | |
| 6,266,612 B1 | 7/2001 | Dussell et al. | |
| 6,266,683 B1 | 7/2001 | Yehuda et al. | |
| 6,269,309 B1 | 7/2001 | Buckingham | |
| 6,275,774 B1 | 8/2001 | Baron, Sr. et al. | |
| 6,289,277 B1 | 9/2001 | Feyereisen | |
| 6,295,001 B1 | 9/2001 | Barber | |
| 6,295,502 B1 | 9/2001 | Hancock et al. | |
| 6,297,766 B1 | 10/2001 | Koeller | |
| 6,329,904 B1 | 12/2001 | Lamb | |
| 6,333,980 B1 | 12/2001 | Hollatz et al. | |
| 6,334,133 B1 | 12/2001 | Thompson et al. | |
| 6,339,744 B1 | 1/2002 | Hancock et al. | |
| 6,339,747 B1 | 1/2002 | Daly et al. | |
| 6,343,255 B1 | 1/2002 | Peek et al. | |
| 6,347,216 B1 | 2/2002 | Marko et al. | |
| 6,351,218 B1 | 2/2002 | Smith | |
| 6,356,834 B2 | 3/2002 | Hancock et al. | |
| 6,360,172 B1 | 3/2002 | Burfeind et al. | |
| 6,363,411 B1 | 3/2002 | Dugan et al. | |
| 6,380,869 B1 | 4/2002 | Simon et al. | |
| 6,381,535 B1 | 4/2002 | Durocher et al. | |
| 6,396,397 B1 | 5/2002 | Bos et al. | |
| 6,404,880 B1 | 6/2002 | Stevens | |
| 6,405,134 B1 | 6/2002 | Smith et al. | |
| 6,408,337 B1 | 6/2002 | Dietz et al. | |
| 6,411,687 B1 | 6/2002 | Bohacek et al. | |
| 6,411,809 B1 | 6/2002 | Haakana et al. | |
| 6,418,371 B1 | 7/2002 | Arnold | |
| 6,430,562 B1 | 8/2002 | Kardos et al. | |
| 6,446,004 B1 | 9/2002 | Cao et al. | |
| 6,456,852 B2 | 9/2002 | Bar et al. | |
| 6,462,665 B1 | 10/2002 | Tarlton et al. | |
| 6,469,664 B1 | 10/2002 | Michaelson et al. | |
| 6,473,692 B2 | 10/2002 | Hancock et al. | |
| 6,484,033 B2 | 11/2002 | Murray | |
| 6,490,525 B2 | 12/2002 | Baron, Sr. et al. | |
| 6,493,633 B2 | 12/2002 | Baron, Sr. et al. | |
| 6,496,776 B1 | 12/2002 | Blumberg et al. | |
| 6,497,367 B2 | 12/2002 | Conzola et al. | |
| 6,498,987 B1 | 12/2002 | Kelly et al. | |
| 6,501,392 B2 | 12/2002 | Gremmert et al. | |
| 6,505,123 B1 * | 1/2003 | Root | G01W 1/00 702/3 |
| 6,519,571 B1 * | 2/2003 | Guheen | G06Q 30/02 705/14.66 |
| 6,522,875 B1 | 2/2003 | Dowling et al. | |
| 6,522,888 B1 | 2/2003 | Garceran et al. | |
| 6,526,268 B1 | 2/2003 | Marrah et al. | |
| 6,526,335 B1 * | 2/2003 | Treyz | G01C 21/26 307/10.1 |
| 6,531,218 B2 | 3/2003 | Hoyt et al. | |
| 6,542,825 B2 | 4/2003 | Jones et al. | |
| 6,552,682 B1 | 4/2003 | Fan | |
| 6,553,317 B1 | 4/2003 | Lincoln et al. | |
| 6,560,456 B1 | 5/2003 | Lohtia et al. | |
| 6,564,143 B1 | 5/2003 | Alewine et al. | |
| 6,571,279 B1 | 5/2003 | Herz et al. | |
| 6,578,005 B1 | 6/2003 | Lesaint et al. | |
| 6,587,813 B1 | 7/2003 | Whitt et al. | |
| 6,587,831 B1 | 7/2003 | O'Brien | |
| 6,587,851 B1 | 7/2003 | Ditcharo et al. | |
| 6,590,529 B2 | 7/2003 | Schwoegler | |
| 6,597,983 B2 | 7/2003 | Hancock | |
| 6,603,405 B2 | 8/2003 | Smith | |
| 6,609,062 B2 | 8/2003 | Hancock | |
| 6,611,687 B1 | 8/2003 | Clark et al. | |
| 6,618,593 B1 | 9/2003 | Drutman et al. | |
| 6,633,900 B1 | 10/2003 | Khalessi et al. | |
| 6,646,559 B2 | 11/2003 | Smith | |
| 6,647,257 B2 | 11/2003 | Owensby | |
| 6,650,902 B1 | 11/2003 | Richton | |
| 6,650,972 B1 | 11/2003 | Robinson et al. | |
| 6,654,689 B1 | 11/2003 | Kelly et al. | |
| 6,675,151 B1 | 1/2004 | Thompson et al. | |
| 6,677,894 B2 | 1/2004 | Sheynblat et al. | |
| 6,678,700 B1 | 1/2004 | Moore et al. | |
| 6,680,675 B1 | 1/2004 | Suzuki | |
| 6,684,136 B2 | 1/2004 | Sinex | |
| 6,697,859 B1 | 2/2004 | Takahashi | |
| 6,700,482 B2 | 3/2004 | Ververs et al. | |
| 6,707,905 B2 | 3/2004 | Lenard | |
| 6,708,211 B1 | 3/2004 | Tingley et al. | |
| 6,731,940 B1 | 5/2004 | Nagendran | |
| 6,742,002 B2 | 5/2004 | Arrowood | |
| 6,745,021 B1 | 6/2004 | Stevens | |
| 6,745,036 B1 | 6/2004 | Dunne et al. | |
| 6,751,553 B2 | 6/2004 | Young et al. | |
| 6,753,784 B1 | 6/2004 | Sznaider et al. | |
| 6,754,585 B2 | 6/2004 | Root et al. | |
| 6,792,615 B1 | 9/2004 | Rowe et al. | |
| 6,798,358 B2 | 9/2004 | Joyce et al. | |
| 6,812,855 B1 | 11/2004 | Sudou et al. | |
| 6,816,878 B1 | 11/2004 | Zimmers et al. | |
| 6,823,263 B1 | 11/2004 | Kelly et al. | |
| 6,823,315 B1 | 11/2004 | Bucci et al. | |
| 6,823,344 B1 | 11/2004 | Isensee et al. | |
| 6,826,481 B2 | 11/2004 | Root et al. | |
| 6,829,233 B1 | 12/2004 | Gilboy | |
| 6,829,334 B1 | 12/2004 | Zirngibl et al. | |
| 6,829,536 B2 | 12/2004 | Moore | |
| 6,836,730 B2 | 12/2004 | Root et al. | |
| 6,838,998 B1 | 1/2005 | Brown et al. | |
| 6,845,324 B2 | 1/2005 | Smith | |
| 6,850,895 B2 | 2/2005 | Brodersen et al. | |
| 6,853,915 B2 | 2/2005 | Hubschneider et al. | |

(56) References Cited

U.S. PATENT DOCUMENTS

| | | | |
|---|---|---|---|
| 6,861,959 | B1 | 3/2005 | Torres Sabate et al. |
| 6,865,538 | B2 | 3/2005 | Chithambaram et al. |
| 6,892,390 | B1 * | 5/2005 | Lieberman ............ H04H 20/28 348/E5.006 |
| 6,909,361 | B2 | 6/2005 | McCarthy et al. |
| 6,909,903 | B2 | 6/2005 | Wang |
| 6,912,545 | B1 | 6/2005 | Lundy et al. |
| 6,941,126 | B1 | 9/2005 | Jordan, Jr. |
| 6,944,443 | B2 | 9/2005 | Bates et al. |
| 6,944,447 | B2 | 9/2005 | Portman et al. |
| 6,962,531 | B2 | 11/2005 | Pace et al. |
| 6,973,384 | B2 | 12/2005 | Zhao et al. |
| 6,975,942 | B2 | 12/2005 | Young et al. |
| 6,980,909 | B2 | 12/2005 | Root et al. |
| 6,985,813 | B2 | 1/2006 | Root et al. |
| 6,985,929 | B1 | 1/2006 | Wilson et al. |
| 6,988,037 | B2 | 1/2006 | Root et al. |
| 6,989,765 | B2 | 1/2006 | Gueziec |
| 6,990,458 | B2 | 1/2006 | Harrison et al. |
| 7,010,501 | B1 | 3/2006 | Roslak et al. |
| 7,016,689 | B2 | 3/2006 | Clark et al. |
| 7,024,205 | B1 | 4/2006 | Hose |
| 7,024,310 | B2 | 4/2006 | Root et al. |
| 7,031,724 | B2 | 4/2006 | Ross et al. |
| 7,047,114 | B1 | 5/2006 | Rogers |
| 7,053,780 | B1 | 5/2006 | Straub et al. |
| 7,058,510 | B2 | 6/2006 | Kelly et al. |
| 7,072,666 | B1 | 7/2006 | Kullman et al. |
| 7,079,631 | B1 * | 7/2006 | Kaufman ............ H04M 3/4874 379/88.2 |
| 7,080,018 | B1 | 7/2006 | Fox et al. |
| 7,084,757 | B2 | 8/2006 | Terui |
| 7,084,775 | B1 | 8/2006 | Smith |
| 7,089,115 | B2 | 8/2006 | Chapman et al. |
| 7,089,116 | B2 | 8/2006 | Smith |
| 7,096,276 | B2 | 8/2006 | Bodin et al. |
| 7,103,596 | B2 | 9/2006 | Abe et al. |
| 7,123,926 | B2 | 10/2006 | Himmelstein |
| 7,139,664 | B2 | 11/2006 | Kelly et al. |
| 7,164,986 | B2 | 1/2007 | Humphries et al. |
| 7,171,325 | B2 | 1/2007 | Hsu et al. |
| 7,171,372 | B2 | 1/2007 | Daniel et al. |
| 7,181,345 | B2 | 2/2007 | Rosenfeld et al. |
| 7,184,540 | B2 | 2/2007 | Dezonno et al. |
| 7,184,896 | B1 | 2/2007 | Benson |
| 7,185,044 | B2 | 2/2007 | Ryan et al. |
| 7,191,064 | B1 | 3/2007 | Myers et al. |
| 7,191,065 | B2 | 3/2007 | Root et al. |
| 7,197,308 | B2 | 3/2007 | Singhal et al. |
| 7,203,502 | B2 | 4/2007 | Wilson et al. |
| 7,212,811 | B2 | 5/2007 | Dowling et |
| 7,212,829 | B1 | 5/2007 | Lau et al. |
| 7,218,938 | B1 | 5/2007 | Lau et al. |
| 7,219,066 | B2 | 5/2007 | Parks et al. |
| 7,221,947 | B2 | 5/2007 | Casey |
| 7,231,657 | B2 | 6/2007 | Honarvar et al. |
| 7,233,781 | B2 | 6/2007 | Hunter et al. |
| 7,248,159 | B2 | 7/2007 | Smith |
| 7,254,406 | B2 | 8/2007 | Beros et al. |
| 7,254,481 | B2 | 8/2007 | Yamada et al. |
| 7,254,588 | B2 | 8/2007 | Sung et al. |
| 7,259,668 | B2 | 8/2007 | Casey |
| 7,269,505 | B2 | 9/2007 | Zhao et al. |
| 7,280,822 | B2 | 10/2007 | Fraccaroli |
| 7,283,971 | B1 | 10/2007 | Levine et al. |
| 7,284,000 | B2 | 10/2007 | Kuehr-McLaren et al. |
| 7,284,033 | B2 | 10/2007 | Jhanji |
| 7,289,908 | B2 | 10/2007 | Root et al. |
| 7,299,492 | B2 | 11/2007 | Thrash et al. |
| 7,315,782 | B2 | 1/2008 | Root et al. |
| 7,327,271 | B2 | 2/2008 | Greenstein et al. |
| 7,330,693 | B1 * | 2/2008 | Goss ............ H04H 20/59 455/3.01 |
| 7,336,964 | B2 | 2/2008 | Casey |
| 7,366,522 | B2 | 4/2008 | Thomas |
| 7,383,130 | B1 | 6/2008 | Koosam |
| 7,392,042 | B2 | 6/2008 | Bates et al. |
| 7,397,390 | B2 | 7/2008 | DiPiazza |
| 7,400,976 | B2 | 7/2008 | Young et al. |
| 7,403,925 | B2 | 7/2008 | Schlesinger et al. |
| 7,406,382 | B2 | 7/2008 | Brulle-Drews |
| 7,411,493 | B2 | 8/2008 | Smith |
| 7,412,234 | B2 | 8/2008 | Zellner |
| 7,421,344 | B1 | 9/2008 | Marsh et al. |
| 7,426,203 | B1 | 9/2008 | McNamara et al. |
| 7,502,748 | B1 | 3/2009 | Baldwin et al. |
| 7,557,730 | B2 | 7/2009 | Gueziec |
| 7,567,575 | B2 | 7/2009 | Chen et al. |
| 7,568,217 | B1 | 7/2009 | Prasad et al. |
| 7,599,795 | B1 | 10/2009 | Blumberg et al. |
| 7,602,285 | B2 | 10/2009 | Sznaider et al. |
| 7,606,663 | B2 | 10/2009 | Neef et al. |
| 7,647,022 | B2 | 1/2010 | Ng et al. |
| 7,650,633 | B2 | 1/2010 | Whitson |
| 7,668,832 | B2 | 2/2010 | Yeh et al. |
| 7,706,523 | B2 | 4/2010 | Agusta |
| 7,716,077 | B1 | 5/2010 | Mikurak |
| 7,720,606 | B2 | 5/2010 | Burfeind et al. |
| 7,848,765 | B2 | 12/2010 | Phillips et al. |
| 7,860,376 | B2 | 12/2010 | Kudo et al. |
| 7,890,124 | B2 | 2/2011 | Smith et al. |
| 7,899,469 | B2 | 3/2011 | Casey |
| 7,917,555 | B2 | 3/2011 | Gottumukkala et al. |
| 7,970,912 | B2 | 6/2011 | Bourne |
| 8,019,692 | B2 | 9/2011 | Rosen |
| 8,023,929 | B2 | 9/2011 | Mgrdechian et al. |
| 8,027,691 | B2 | 9/2011 | Bernas et al. |
| 8,102,253 | B1 | 1/2012 | Brady, Jr. |
| 8,149,697 | B2 | 4/2012 | Parkkinen et al. |
| 8,204,513 | B2 | 6/2012 | Crowley et al. |
| 8,229,467 | B2 | 7/2012 | Root et al. |
| 8,290,506 | B1 | 10/2012 | Coverstone |
| 8,295,851 | B2 | 10/2012 | Finnegan et al. |
| 8,359,019 | B2 | 1/2013 | Ramer et al. |
| 8,483,651 | B1 | 7/2013 | Zamora et al. |
| 8,538,451 | B2 | 9/2013 | Ruutu et al. |
| 8,538,458 | B2 | 9/2013 | Haney |
| 8,594,715 | B1 | 11/2013 | Stewart |
| 8,634,814 | B2 | 1/2014 | Root et al. |
| 9,237,416 | B2 | 1/2016 | Root et al. |
| 9,392,460 | B1 | 7/2016 | Blake et al. |
| 2001/0029160 | A1 | 10/2001 | Aznal |
| 2001/0030624 | A1 | 10/2001 | Schwoegler |
| 2001/0042001 | A1 | 11/2001 | Goto et al. |
| 2001/0045886 | A1 | 11/2001 | Minowa |
| 2001/0049584 | A1 | 12/2001 | Jones et al. |
| 2001/0049636 | A1 | 12/2001 | Hudda et al. |
| 2001/0051888 | A1 | 12/2001 | Mayhak et al. |
| 2001/0053999 | A1 | 12/2001 | Feinberg |
| 2002/0000930 | A1 | 1/2002 | Crowson et al. |
| 2002/0009353 | A1 | 1/2002 | Kelsey et al. |
| 2002/0010615 | A1 | 1/2002 | Jacobs |
| 2002/0025964 | A1 | 2/2002 | Streuff et al. |
| 2002/0029160 | A1 | 3/2002 | Thompson et al. |
| 2002/0029272 | A1 | 3/2002 | Weller |
| 2002/0040313 | A1 | 4/2002 | Hunter et al. |
| 2002/0046259 | A1 | 4/2002 | Glorikian |
| 2002/0048283 | A1 | 4/2002 | Lin |
| 2002/0049310 | A1 | 4/2002 | Tateishi et al. |
| 2002/0052674 | A1 | 5/2002 | Chang et al. |
| 2002/0062451 | A1 | 5/2002 | Scheidt et al. |
| 2002/0077876 | A1 | 6/2002 | O'Meara et al. |
| 2002/0091568 | A1 | 7/2002 | Kraft et al. |
| 2002/0095333 | A1 | 7/2002 | Jokinen et al. |
| 2002/0147642 | A1 | 10/2002 | Avallone et al. |
| 2002/0160745 | A1 | 10/2002 | Wang |
| 2002/0165732 | A1 | 11/2002 | Ezzeddine et al. |
| 2002/0173981 | A1 | 11/2002 | Stewart |
| 2002/0175211 | A1 | 11/2002 | Dominguez et al. |
| 2002/0183117 | A1 | 12/2002 | Takahashi et al. |
| 2002/0194366 | A1 | 12/2002 | Bodin et al. |
| 2003/0004780 | A1 | 1/2003 | Smith et al. |
| 2003/0004802 | A1 | 1/2003 | Callegari |
| 2003/0014297 | A1 | 1/2003 | Kaufman et al. |

(56) References Cited

U.S. PATENT DOCUMENTS

| | | |
|---|---|---|
| 2003/0028410 A1 | 2/2003 | House et al. |
| 2003/0055705 A1 | 3/2003 | Kilpatrick |
| 2003/0059158 A1 | 3/2003 | Lacey |
| 2003/0060211 A1 | 3/2003 | Chern et al. |
| 2003/0068974 A1 | 4/2003 | Kanamaluru et al. |
| 2003/0100315 A1 | 5/2003 | Rankin |
| 2003/0113014 A1 | 6/2003 | Katoh |
| 2003/0125963 A1 | 7/2003 | Haken |
| 2003/0132298 A1 | 7/2003 | Swartz et al. |
| 2003/0149607 A1 | 8/2003 | Ogasawara et al. |
| 2003/0169367 A1 * | 9/2003 | Ranta .............. H04N 7/085 348/465 |
| 2003/0171870 A1 | 9/2003 | Gueziec |
| 2003/0191765 A1 | 10/2003 | Bargh et al. |
| 2003/0191795 A1 | 10/2003 | Bernardin et al. |
| 2003/0198337 A1 | 10/2003 | Lenard |
| 2004/0002348 A1 | 1/2004 | Fraccaroli |
| 2004/0010372 A1 | 1/2004 | Schwoegler |
| 2004/0010591 A1 | 1/2004 | Sinn et al. |
| 2004/0014486 A1 | 1/2004 | Carlton et al. |
| 2004/0023666 A1 | 2/2004 | Moon et al. |
| 2004/0059996 A1 | 3/2004 | Fasciano |
| 2004/0077347 A1 | 4/2004 | Lauber et al. |
| 2004/0093265 A1 | 5/2004 | Ramchandani et al. |
| 2004/0107126 A1 | 6/2004 | Kataoka et al. |
| 2004/0110515 A1 | 6/2004 | Blumberg et al. |
| 2004/0120298 A1 | 6/2004 | Evans et al. |
| 2004/0130463 A1 | 7/2004 | Bloomquist et al. |
| 2004/0161097 A1 | 8/2004 | Henry |
| 2004/0167813 A1 | 8/2004 | Robertson et al. |
| 2004/0172343 A1 | 9/2004 | Allibhoy et al. |
| 2004/0199655 A1 | 10/2004 | Davies et al. |
| 2004/0203630 A1 | 10/2004 | Wang |
| 2004/0203854 A1 | 10/2004 | Nowak |
| 2004/0221308 A1 | 11/2004 | Cuttner et al. |
| 2004/0267595 A1 | 12/2004 | Woodings et al. |
| 2005/0003828 A1 | 1/2005 | Sugar et al. |
| 2005/0021666 A1 | 1/2005 | Dinnage et al. |
| 2005/0021806 A1 | 1/2005 | Richardson et al. |
| 2005/0021980 A1 | 1/2005 | Kanai |
| 2005/0027449 A1 | 2/2005 | Marsh |
| 2005/0040847 A1 | 2/2005 | Unger et al. |
| 2005/0049789 A1 | 3/2005 | Kelly et al. |
| 2005/0050008 A1 | 3/2005 | Root et al. |
| 2005/0055374 A1 | 3/2005 | Sato |
| 2005/0096040 A1 | 5/2005 | Haberman et al. |
| 2005/0096962 A1 | 5/2005 | Narasimhan et al. |
| 2005/0136917 A1 | 6/2005 | Taylor |
| 2005/0136949 A1 | 6/2005 | Barnes, Jr. |
| 2005/0136983 A1 | 6/2005 | Agapi et al. |
| 2005/0174235 A1 | 8/2005 | Davis et al. |
| 2005/0181803 A1 | 8/2005 | Weaver et al. |
| 2005/0192724 A1 | 9/2005 | Hendry |
| 2005/0227709 A1 | 10/2005 | Chang et al. |
| 2005/0228873 A1 | 10/2005 | Tapuska et al. |
| 2005/0240378 A1 | 10/2005 | Smith et al. |
| 2005/0243784 A1 | 11/2005 | Fitzgerald et al. |
| 2005/0245243 A1 | 11/2005 | Zuniga |
| 2005/0251370 A1 | 11/2005 | Li et al. |
| 2006/0009155 A1 | 1/2006 | Paalasmaa et al. |
| 2006/0010467 A1 | 1/2006 | Segel |
| 2006/0022846 A1 | 2/2006 | Tummala |
| 2006/0028400 A1 | 2/2006 | Lapstun et al. |
| 2006/0036457 A1 | 2/2006 | McNamara |
| 2006/0046740 A1 | 3/2006 | Johnson |
| 2006/0047825 A1 | 3/2006 | Steenstra et al. |
| 2006/0111089 A1 | 5/2006 | Winter et al. |
| 2006/0123053 A1 | 6/2006 | Scannell |
| 2006/0142024 A1 | 6/2006 | Thalanany et al. |
| 2006/0161469 A1 | 7/2006 | Root et al. |
| 2006/0164259 A1 | 7/2006 | Winkler et al. |
| 2006/0178140 A1 | 8/2006 | Smith et al. |
| 2006/0194595 A1 | 8/2006 | Myllynen et al. |
| 2006/0200480 A1 | 9/2006 | Harris et al. |
| 2006/0265228 A1 | 11/2006 | Ando |
| 2006/0265238 A1 | 11/2006 | Perrier et al. |
| 2006/0271560 A1 | 11/2006 | Mitchell |
| 2006/0293065 A1 * | 12/2006 | Chew .............. G06Q 30/02 455/456.3 |
| 2006/0294147 A1 | 12/2006 | Root et al. |
| 2007/0001904 A1 | 1/2007 | Mendelson |
| 2007/0005363 A1 | 1/2007 | Cucerzan et al. |
| 2007/0021906 A1 | 1/2007 | Yeh et al. |
| 2007/0024469 A1 | 2/2007 | Chou |
| 2007/0030973 A1 | 2/2007 | Mikan |
| 2007/0050128 A1 | 3/2007 | Lee et al. |
| 2007/0061300 A1 | 3/2007 | Ramer et al. |
| 2007/0061844 A1 | 3/2007 | Hakusui et al. |
| 2007/0094071 A1 | 4/2007 | Seraji et al. |
| 2007/0112511 A1 | 5/2007 | Burfeind et al. |
| 2007/0127423 A1 | 6/2007 | Ho |
| 2007/0162320 A1 | 7/2007 | Joshi et al. |
| 2007/0162328 A1 | 7/2007 | Reich |
| 2007/0168131 A1 | 7/2007 | Root et al. |
| 2007/0168524 A1 | 7/2007 | Chao et al. |
| 2007/0180119 A1 | 8/2007 | Khivesara et al. |
| 2007/0192159 A1 | 8/2007 | Root et al. |
| 2007/0197231 A1 | 8/2007 | Lin |
| 2007/0202844 A1 | 8/2007 | Wilson et al. |
| 2007/0260531 A1 | 11/2007 | Bezancon |
| 2007/0260708 A1 | 11/2007 | Beaton et al. |
| 2007/0260741 A1 | 11/2007 | Bezancon |
| 2007/0270165 A1 | 11/2007 | Poosala |
| 2007/0270166 A1 | 11/2007 | Hampel et al. |
| 2007/0293240 A1 | 12/2007 | Drennan |
| 2008/0020702 A1 | 1/2008 | Jendbro et al. |
| 2008/0021645 A1 | 1/2008 | Lau et al. |
| 2008/0064351 A1 | 3/2008 | Landschaft et al. |
| 2008/0070550 A1 | 3/2008 | Hose |
| 2008/0082264 A1 | 4/2008 | Hill et al. |
| 2008/0084857 A1 | 4/2008 | Gorti et al. |
| 2008/0134043 A1 | 6/2008 | Georgis et al. |
| 2008/0134258 A1 | 6/2008 | Goose et al. |
| 2008/0140318 A1 | 6/2008 | Breed |
| 2008/0157990 A1 | 7/2008 | Belzer et al. |
| 2008/0160956 A1 | 7/2008 | Jackson et al. |
| 2008/0160966 A1 | 7/2008 | McKiou et al. |
| 2008/0161012 A1 | 7/2008 | Haran et al. |
| 2008/0162036 A1 | 7/2008 | Breed |
| 2008/0183710 A1 | 7/2008 | Serjeantson et al. |
| 2008/0189028 A1 | 8/2008 | Nair et al. |
| 2008/0207183 A1 | 8/2008 | Root et al. |
| 2008/0271120 A1 | 10/2008 | Parkes et al. |
| 2008/0275759 A1 | 11/2008 | Parkes et al. |
| 2008/0294478 A1 | 11/2008 | Joshi et al. |
| 2008/0313037 A1 | 12/2008 | Root et al. |
| 2008/0319652 A1 | 12/2008 | Moshfeghi |
| 2008/0319653 A1 | 12/2008 | Moshfeghi |
| 2009/0061903 A1 | 3/2009 | Khokhar |
| 2009/0073885 A1 | 3/2009 | Jalil et al. |
| 2009/0083150 A1 | 3/2009 | Mashinsky |
| 2009/0131080 A1 | 5/2009 | Nadler et al. |
| 2009/0156161 A1 | 6/2009 | Strahs |
| 2009/0176511 A1 | 7/2009 | Morrison |
| 2009/0176512 A1 | 7/2009 | Morrison |
| 2009/0177374 A1 | 7/2009 | Liu |
| 2009/0209233 A1 | 8/2009 | Morrison |
| 2009/0210441 A1 | 8/2009 | Mercer et al. |
| 2009/0233575 A1 | 9/2009 | Morrison |
| 2009/0233633 A1 | 9/2009 | Morrison |
| 2009/0239511 A1 | 9/2009 | Chen et al. |
| 2009/0240428 A1 | 9/2009 | Shahrestani |
| 2009/0265099 A1 | 10/2009 | Gottlieb |
| 2009/0275348 A1 | 11/2009 | Weinreich et al. |
| 2009/0285483 A1 | 11/2009 | Guven et al. |
| 2009/0287587 A1 | 11/2009 | Bloebaum et al. |
| 2009/0305645 A1 | 12/2009 | Watanabe |
| 2010/0009657 A1 | 1/2010 | Dingler et al. |
| 2010/0013629 A1 | 1/2010 | Sznaider et al. |
| 2010/0036717 A1 | 2/2010 | Trest |
| 2010/0042483 A1 | 2/2010 | Hipsher |
| 2010/0069052 A1 | 3/2010 | Ahomaki et al. |
| 2010/0069093 A1 | 3/2010 | Morrison |
| 2011/0230204 A1 | 9/2011 | Root et al. |

(56) References Cited

U.S. PATENT DOCUMENTS

| | | |
|---|---|---|
| 2012/0116861 A1 | 5/2012 | Dobyns |
| 2012/0129553 A1 | 5/2012 | Phillips et al. |
| 2012/0166350 A1 | 6/2012 | Piccionelli et al. |
| 2012/0229624 A1 | 9/2012 | Calman et al. |
| 2013/0057551 A1 | 3/2013 | Ebert et al. |
| 2013/0165070 A1 | 6/2013 | Hoffberg |
| 2013/0290106 A1 | 10/2013 | Bradley et al. |
| 2015/0186538 A1 | 7/2015 | Yan |

FOREIGN PATENT DOCUMENTS

| | | |
|---|---|---|
| AU | 2007207616 A1 | 7/2007 |
| AU | 2006202473 A1 | 1/2010 |
| AU | 2012200288 A1 | 2/2012 |
| CA | 2418268 A1 | 1/2002 |
| CA | 2514868 A1 | 8/2004 |
| CA | 2594001 A1 | 7/2006 |
| CN | 1230265 A | 9/1999 |
| CN | 1449615 A | 10/2003 |
| CN | 1659602 A | 8/2005 |
| CN | 1745540 A | 3/2006 |
| CN | 101083784 A | 12/2007 |
| CN | 101120316 A | 2/2008 |
| EP | 0436263 A1 | 7/1991 |
| EP | 0703463 A2 | 3/1996 |
| EP | 0798539 A2 | 10/1997 |
| EP | 1143399 A1 | 10/2001 |
| EP | 1303965 A2 | 4/2003 |
| EP | 1473684 A1 | 11/2004 |
| EP | 1593085 A2 | 11/2005 |
| EP | 1856608 A2 | 11/2007 |
| EP | 1912409 A1 | 4/2008 |
| EP | 1999665 A2 | 12/2008 |
| EP | 2115613 A2 | 11/2009 |
| EP | 2720481 A2 | 4/2014 |
| GB | 2201865 A | 9/1988 |
| GB | 2216319 A | 10/1989 |
| JP | 06508964 | 10/1994 |
| JP | 08221694 A | 8/1996 |
| JP | 10065596 A | 3/1998 |
| JP | H10-65596 A | 3/1998 |
| JP | 11-136365 A | 5/1999 |
| JP | H11-215569 A | 8/1999 |
| JP | 2000030148 A | 1/2000 |
| JP | 2000167232 A | 6/2000 |
| JP | 2001126170 A | 5/2001 |
| JP | 2001175718 A | 6/2001 |
| JP | 2002019928 A | 1/2002 |
| JP | 2002028137 A | 1/2002 |
| JP | 2002056156 A | 2/2002 |
| JP | 2002140451 A | 5/2002 |
| JP | 2002162478 A | 6/2002 |
| JP | 2002216021 A | 8/2002 |
| JP | 2002251484 A | 9/2002 |
| JP | 2002255465 | 9/2002 |
| JP | 2002255465 A | 9/2002 |
| JP | 2002269335 A | 9/2002 |
| JP | 2002303527 A | 10/2002 |
| JP | 2002324075 A | 11/2002 |
| JP | 2003099350 A | 4/2003 |
| JP | 2003186900 A | 7/2003 |
| JP | 2003187371 A | 7/2003 |
| JP | 2003196284 A | 7/2003 |
| JP | 2003208367 A | 7/2003 |
| JP | 200245339 A | 9/2003 |
| JP | 2003272078 A | 9/2003 |
| JP | 2003280561 A | 10/2003 |
| JP | 2003281694 A | 10/2003 |
| JP | 2003323528 A | 11/2003 |
| JP | 2003337874 A | 11/2003 |
| JP | 2004505501 A | 2/2004 |
| JP | 2004110496 | 4/2004 |
| JP | 2004127044 A | 4/2004 |
| JP | 2004511836 A | 4/2004 |
| JP | 2004514333 A | 5/2004 |
| JP | 2004157863 A | 6/2004 |
| JP | 2004529543 A | 9/2004 |
| JP | 2004282610 A | 10/2004 |
| JP | 2004328308 A | 11/2004 |
| JP | 2004334782 A | 11/2004 |
| JP | 2004538558 A | 12/2004 |
| JP | 2005073147 A | 3/2005 |
| JP | 2005080208 A | 3/2005 |
| JP | 2005094229 A | 4/2005 |
| JP | 2005175896 A | 6/2005 |
| JP | 2005184065 A | 7/2005 |
| JP | 2005293255 A | 10/2005 |
| JP | 2005-309489 A | 11/2005 |
| JP | 2006011617 A | 1/2006 |
| JP | 2006107136 A | 4/2006 |
| JP | 2006127144 A | 5/2006 |
| JP | 2006198838 A | 8/2006 |
| JP | 2006520497 A | 9/2006 |
| JP | 2007-265449 A | 10/2007 |
| JP | 2009524150 A | 6/2009 |
| JP | 2012083743 A | 4/2012 |
| KR | 20010100635 A | 11/2001 |
| KR | 20020090910 A | 12/2002 |
| KR | 20030075238 A | 9/2003 |
| KR | 20040010513 A | 1/2004 |
| KR | 20050080370 A | 8/2005 |
| KR | 20110012122 A | 2/2011 |
| KR | 20140100173 A | 8/2014 |
| WO | WO-9607110 A1 | 3/1996 |
| WO | WO-9741654 A1 | 11/1997 |
| WO | WO-9802824 A1 | 1/1998 |
| WO | WO-9819479 A1 | 5/1998 |
| WO | WO-9923591 A1 | 5/1999 |
| WO | WO-9957700 A1 | 11/1999 |
| WO | WO-0004730 A1 | 1/2000 |
| WO | WO-0004734 A1 | 1/2000 |
| WO | WO-0004737 A1 | 1/2000 |
| WO | WO-0013047 A1 | 3/2000 |
| WO | WO-0041104 | 7/2000 |
| WO | WO-0195140 A2 | 12/2001 |
| WO | WO-0209353 A2 | 1/2002 |
| WO | WO-0221864 A1 | 3/2002 |
| WO | WO-0225964 A2 | 3/2002 |
| WO | WO-02/28137 A1 | 4/2002 |
| WO | WO-0239217 A2 | 5/2002 |
| WO | WO-0239732 A1 | 5/2002 |
| WO | WO-0249310 A2 | 6/2002 |
| WO | WO-03069576 A1 | 8/2003 |
| WO | WO-2004059996 A1 | 7/2004 |
| WO | WO-2004070993 A2 | 8/2004 |
| WO | WO-2005040847 A2 | 5/2005 |
| WO | WO-2006076460 A2 | 7/2006 |
| WO | WO-2006094086 A2 | 9/2006 |
| WO | WO-2006105088 A2 | 10/2006 |
| WO | WO-2007/084458 A2 | 7/2007 |
| WO | WO-2007084458 A2 | 7/2007 |

OTHER PUBLICATIONS

Myers, "Personal Digital Radio Service," IBM Technical Disclosure Bulletin, vol. 38, No. 8, p. 315, Aug. 1995.

Vantive and MDSI to Provide Enterprise Wide Wireless Field Service Solution PR Newswire, Oct. 26, 1998.

Visual Staff Scheduler Pro Version 3.0 User Guide Atlas Business Solutions, Inc. 1997.

Maxima Advantase Call Center CRM Solutions, vol. 18, No. 7, Jan. 2000.

Author Unknown, "MDSI Mobile Data Solution—Innovative and Effective Mobile Workforce Management," MDSI-Advantex.com, Feb. 1999, 19 pp.

MobileCentrex.com Web Pages, Mobile Centrex, Mar. 2003, Retrieved from Archive.orq Oct. 15, 2008.

Dispatch definition, Retrieved from Wikipedia.orq Oct. 15, 2008.

Author Unknown, "iMedeon Announces Support for Microsoft Windows CE Devices for its Wireless, Web-Based Mobile Workforce Management Applications," Business Wire, Feb. 5, 2001, 2 pp., ProQuest LLC, New York, NY, USA.

(56) References Cited

OTHER PUBLICATIONS

Partyka, et al., "On the Road to Service," ORMS Today, Aug. 2000, pp. 1-8, Lionheart Publishing, Inc., Marietta, GA, USA.

Author Unknown, "MobileAria and WeatherBank Announce Partnership to Avert Delays, Increase Driver Productivity," Business Wire, Jun. 26, 2001, pp. 1-2, ProQuest LLC, New York, NY, USA.

Weigel, et al., "Applying GIS and OR Techniques to Solve Sears Technician-Dispatching and Home-Delivery Problems," Interfaces, Jan.-Feb. 1999, pp. 112-130, vol. 29, No. 1, Institute for Operations Research and Management Sciences.

Feldman, W. and Feldman, P., "Making Cell Phones Indispensable for Techs," Contractor; Jul. 2004; 51, 7; ABI/INFORM Global, pp. 40 and 54.

Timmins, Annmarie, Mobile Workers Sync Up, IT Support News; Dec. 1999, pp. 28 and 30.

Bisio, R., Gavazzi, F., Malaboccia, F. and Sisto, L., "Effective Resource Scheduling in Work Force Management Context for Telecommunication Work Centers," Centro Studi E. Laboratori Telecommunicazioni, Via G. Reiss Romoli, 274, 10148 Torino, Italy; pp. 1-5.

Lesaint, et al., "Dynamic Workforce Management," AI for Network: Management Systems, Apr. 14, 1997, pp. 1-5, IEE, London, UK.

Rhinehart, Ted, "City Uses GIS to monitor snow-fighting fleet," The American City & County, Apr. 1999, vol. 144, No. 4, p. 31.

Howard County Bureau of Highways, "Web-Enabled Snowplow Tracking System," Howard County, 1999, pp. 1-11.

Kruse, John, "Snow and Ice Go Hi-Tech." Mobile Radio Technology Magazine, Oct. 1, 1999.

Jing, Jin et al., WHAM: Supporting Mobile Workforce and Applications in Workflow Environments RIDE 2000, Research Issues in Data Engineering, Feb. 2000.

Collins, J.E. and Sisley E.M., 3M Company, "Automated Assignment and Scheduling of Service Personnel," AI in Corporate Service & Support; Apr. 1994, IEEE Expert; pp. 33-39.

Ohta, et al., "Real-World Community Platform: Mobile Multi-User Communication System," Multimedia Laboratories, NTT DoCoMo, Inc., 2000, pp. 601-606.

Author Unknown, "The Nexterna Clearview Dispatch Module," 2005, 2 pp., Nexterna Limited, Burlington, Ontario, Canada.

Author Unknown, "Dispenser Services Inc. Selects Web-Based Field Resource Management Solution From Nexterna," PR Newswire, Aug. 14, 2002, 2 pp., ProQuest LLC, New York, NY, USA.

Author Unknown, "Nexterna Announces Newest Release of Nexterna Clearview," PR Newswire, Sep. 26, 2002, 2 pp., ProQuest LLC, New York, NY, USA.

Author Unknown, "Nexterna.com Web Pages Nexterna Inc. 2002-2003," retrieved from Archive. Org on May 20, 2009, 31 pp.

Author Unknown, "Motorola iRadio(TM) System Hits the Road at Consumer Electronics Show 2001," PR Newswire, Jan. 4, 2001, pp. 1-2, ProQuest LLC, New York, NY, USA.

Le Comte, "Using Your Computer—Software Review," Weatherwise, Aug. 1991, pp. 48-51, vol. 44, No. 4.

Freedman, "Pinpoint Weather," Technology Review, Jun. 2003, pp. 52-58, vol. 106, No. 5, ABI/Inform Global.

Author Unknown, "Yahoo! and Weather.com Forge Multi-National Agreement to Provide Enhanced Weather Reports," Business Wire, Jan. 7, 2002, pp. 1-3, ProQuest LLC, New York, NY, USA.

Lee, Jay et al., "Statistical Analysis with Acrview GIS," 2001, Wiley Books, pp. 1-203.

Ohbuchi, et al., "Shape-Similarity Search of Three-Dimensional Models Using Parameterized Statistics," Oct. 9-11, 2002, In the Proceedings of the 10th Pacific Conference on Computer Graphics and Applications, pp. 265-274, IEEE.

Oh et al., "A Model for Role Administration Using Organization Structure",SACMAT '02, Jun. 3-4, 2002, pp. 155-162.

Botha, R.A. et al., "Separation of duties for access control enforcement in workflow environments", IBM Systems Journal, vol. 40, No. 3, 2001, pp. 666-682.

What is Access Management?, 2AB Inc., Jan. 2004, 6 pages.

Harris, Shon, Mike Myer's Certification Passport CISSP, McGraw-Hill, 2002, ISBN 0-07-222578-5, Chapter 2, 54 pages.

Park, Joon S. et al., "Role-Based Access Control on the Web", ACM Transactions on Information and System Security, vol. 4, No. 1, Feb. 2001, pp. 37-71.

McCormick, Vickie L., "Using HR Information systems for HIPAA role-vased access compliance", Journal of Health Care Compliance, vol. 5, No. 2, Mar./Apr. 2003, pp. 31-32.

Langforn, Jeff, "Implementing Least Privilege at your Enterprise", SANS Institute, Jul. 5, 2003, 21 pages.

Cuppens, Frederick et al., "Modeling Contexts in the Or-BAC Model", ACSAC'03, 2003, pp. 1-10.

Principles of Least Privilege definition, Wikipedia.org, Reprinted Jul. 11, 2012, 5 pages.

Sakagumi et al., "ActiveTrace: Mobile Marketing Platform for Location and Behavior-Dependent Information Distribution and Analysis," Collection of Papers/Multimedia, Distribution, Collaboration and Mobile (DICOMO) Symposium, Jun. 27, 2001, vol. 2001, No. 7, pp. 501-506.

Murrary R. Barrick et al., "The Big Five Personality Dimensions and Job Performance: A Meta-Analysis"; Personnel Psychology; Spring 1991; vol. 44; No. 1, pp. 1-26.

\* cited by examiner

INTERACTIVE WEATHER ADVISORY SYSTEM

CROSS-REFERENCE TO RELATED APPLICATIONS

The present application is a continuation of copending U.S. patent application Ser. No. 14/801,555, filed Jul. 16, 2015, which is a continuation of U.S. patent application Ser. No. 14/156,103, filed Jan. 15, 2014, which is a continuation of U.S. patent application Ser. No. 10/965,088, filed Oct. 14, 2004, now U.S. Pat. No. 8,909,679; which is a continuation of U.S. patent application Ser. No. 10/667,108, filed Sep. 19, 2003, now U.S. Pat. No. 6,826,481, which is a continuation of U.S. patent application Ser. No. 10/322,187, filed Dec. 16, 2002, now U.S. Pat. No. 6,754,585, which is a continuation of U.S. patent application Ser. No. 09/624,668, filed Jul. 24, 2000, now U.S. Pat. No. 6,505,123. The entire contents of the above-referenced patent applications are hereby incorporated by reference.

STATEMENT REGARDING FEDERALLY SPONSORED RESEARCH OR DEVELOPMENT

Not applicable.

BACKGROUND OF THE INVENTION

During recent years, the demand for detailed information, such as for example weather information, has risen sharply. Personal computers and communication devices have increased the demand for more information because of their power to gather, manipulate, transmit and receive data. As a result, specialized information and value-added services are in great demand. End users no longer desire to gather, manipulate and evaluate raw data. For instance, nowhere is this condition more apparent than with weather services across North America.

Years ago, radio and television broadcasters recognized an increasing demand for weather information from their audience, and thus increased the number of on-air weather segments as a means for increasing market ranking. Today, the demand for specific content in weather information has exceeded the ability of broadcasters to meet this demand. Virtually every facet of business and personal activities are continually influenced by the weather, good or bad.

In the United States as in most countries, a governmental agency (the National Weather Service in the United States), has the primary responsibility of generating weather products for the general public. These products, such as advisories, statements, and forecasts are generated and made available to third parties, such as broadcasters, newspapers, internet web sites, paging companies and others who, in turn, distribute them to the public. However, this chain of data custody is one way.

Today's lifestyles are fast-paced and sophisticated. Requests for detailed weather information for specific applications outnumber the governments' ability to process them. However, adhering to their mandated responsibility, the National Weather Service generates the general products for public consumption twice daily. This condition forces the public to interpret general and outdated advisories to meet their needs. Often, this interpretation is made erroneously. Even worse, these products are usually regional or national in scope, and may not apply to a particular location where various local activities are underway.

By way of example, weather warnings are broadcast by radio stations across the United States. These warnings identify certain weather impacts within a specified area. In most cases, the warning area includes one or more counties, covering dozens to hundreds of square miles. Most often, these threats (such as severe thunderstorms, tornadoes, etc.), only impact a very small zone within the warning area. These threats also move rapidly. As impacts approach specific zones, they are in fact, moving away from other zones, inside the total warning area. Essentially, the existing reporting system is insufficient to specifically identify and adequately warn of personal risk. Furthermore, if the threat is imminent, the existing system cannot and does not provide preventive measures for each user near or at the threat. Thus, by default, distant or unaffected users are placed "on alert" unnecessarily when the threat may be moving away from their location.

Another common example further clarifies the problem. A family, excited to attend the championship softball game this upcoming weekend, closely monitors the local weather forecast. All week-long the forecast has advised fair to partly cloudy weather for game day. Early on game day, the forecast changes to partly cloudy, with a thirty percent chance for late afternoon showers. The family decides to attend the game, believing that the chances for rain are below their perceived risk level. Unknown to the family at midday, some clusters of showers are intensifying, and will place dangerous lightning over the game field. While the morning weather report was not completely inaccurate, the participants and spectators are exposed to risk. If later asked, it is likely the family members did not hear or remember the weather forecast. They also failed to link their limited knowledge of the weather to their own needs and risk exposure. They did not monitor changing weather events. Most likely, they had no ability to monitor developing risk at the game. Clearly, these people were forced to interpret outdated, limited information, as applied to their specific application.

Therefore, a need exists for a system to automatically and continuously provide consumer customized reports, advisories, alerts, forecasts and warnings relevant to a consumer-defined level of need or dynamic spatial location. It is to such a system that the present invention is directed.

SUMMARY OF THE INVENTION

The present invention provides an interactive advisory system and method of delivering individualized information. More specifically the present invention relates to a broadcast network for selectively transmitting individualized output signals to remote communicator devices. The broadcast network includes a user input database, a communicator location database, an analysis unit and a communication network.

The user input database contains user-defined parameters and each of the user-defined parameters desirably includes a spatial range identifier and a user profile. The user profile in each of the user-defined parameters at least identifies a communicator device associated with a particular user. The communicator location database contains real-time data indicative of the spatial locations of the communicator devices. In one preferred version of the present invention, the communicator location database is automatically and/or continuously updated by the communicator devices.

The information database contains data; such as, real-time weather data for at least the spatial locations contained in the communicator location database. The term "data" describes a wide variety of products, including but not limited to: past and current conditions of weather events; textual products, graphic products, and the like. The analysis unit receives the real-time data from the information database and automatically and continuously compares the spatial range identifier included in the user-defined parameters and the spatial locations of the corresponding communicator devices contained in the communicator location database with the real-time data and upon demand of the user, or even continuously, generates an individualized output signal, such as weather information within the spatial range identified by the spatial range identifier for the user-defined parameters. As new locations are defined by the communicator location database, the information database is automatically updated in real-time.

The communication network transmits each individualized output signal to the particular communicator device defined in the user profile included in the user-defined parameter corresponding with the real-time data and prediction of events. Thus, a user can receive information in real-time specific to the user's immediate spatial location regardless of whether or not the user's location remains fixed or dynamic throughout time.

Other advantages and features of the present invention will become apparent to those skilled in the art when the following detailed description is read in view of the attached drawings and appended claims.

DETAILED DESCRIPTION OF INVENTION

Figure 1:
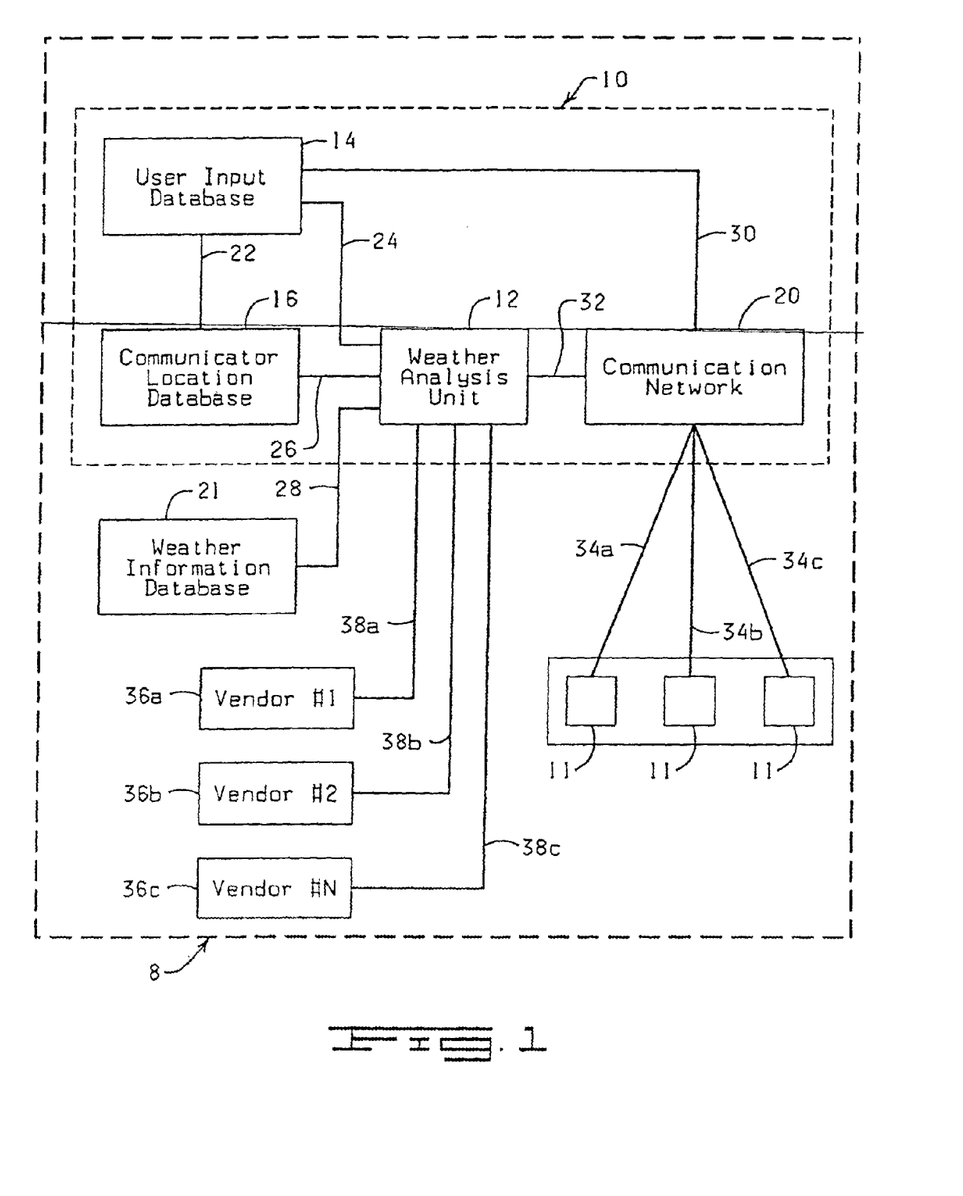
FIG. 1 is a block diagram of an interactive weather advisory system constructed in accordance with the present invention.

Referring now to the drawings and more particularly to FIG. 1 shown therein in block diagram form, is one embodiment of the invention in the form of an interactive weather advisory system 8, constructed in accordance with the present invention. The weather advisory system 8 is provided with a broadcast network 10 for selectively transmitting individualized weather output signals to remote communicator devices 11. The broadcast network 10 includes a weather analysis unit 12, a user input database 14, a communicator location database 16, and a communication network 20. The weather analysis unit 12 receives real-time weather data from a weather information database 21. The weather information database 21 can be located at the broadcast network 10, or remotely from the broadcast network 10. The weather analysis unit 12, the user input database 14, the communicator location database 16, the weather information database 21, and the communication network 20, interrelate and communicate via signal paths 22, 24, 26, 28, 30 and 32.

The user input database 14 permits a plurality of users to input data corresponding to the weather reports, advisories or forecasts such that individualized weather reports, advisories or prediction of events can be transmitted to each individual user. The user input database 14 contains data representative of at least one user-defined parameter correlated to each one of a plurality of users. In one version of the present invention, each of the user-defined parameters includes various information related to weather output signals, such as a spatial range identifier, a user profile, one or more weather content identifiers for identifying particular weather patterns, one or more time identifiers for identifying particular times or time intervals that a user may desire a weather product, a spatial location fixed or dynamic code, and a spatial location identifier for identifying particular spatial locations of interest to the user if the spatial location fixed or dynamic code indicates that the spatial location is to be fixed. The user profile in each of the user-defined parameters includes at least a user identifier code for identifying a particular communicator device 11 associated with a particular user.

For instance, the user identifier code could be a mobile telephone number identifying one of the communicator devices 11, which in this instance could be a mobile telephone or a pager, for example. The weather content identifier could be a computer code to identify one or a variety of weather conditions or events such as tornadoes, thunderstorms, hail storms, lightning storms, showers, snow storms, blizzards, high winds, winds aloft, rapidly rising or rapidly falling barometric pressure or other such weather patterns or conditions. The time identifier desirably could be a computer code for identifying the particular time, times, or time intervals the user desires the interactive weather advisory system 8 to communicate weather data to the user or to monitor the real-time weather data for a particular time and/or date. The spatial location identifier 26 could be a computer code identifying a particular predetermined spatial location such as, by way of example but not limitation, a longitude and latitude anywhere in the world, a town, a county, a township, address, zip code, altitude and combinations thereof.

As discussed above, the spatial location identifier identifies a particular spatial location anywhere in the world and/or altitude above sea level. The spatial range identifier identifies a particular spatial range surrounding the spatial location identifier. Each of the users can select the spatial location identifier and the spatial range identifier so as to receive weather forecasts and/or weather advisories or any other weather information for the spatial location identified by the spatial location identifier, and within the spatial range identified by the spatial range identifier.

Figure 2:
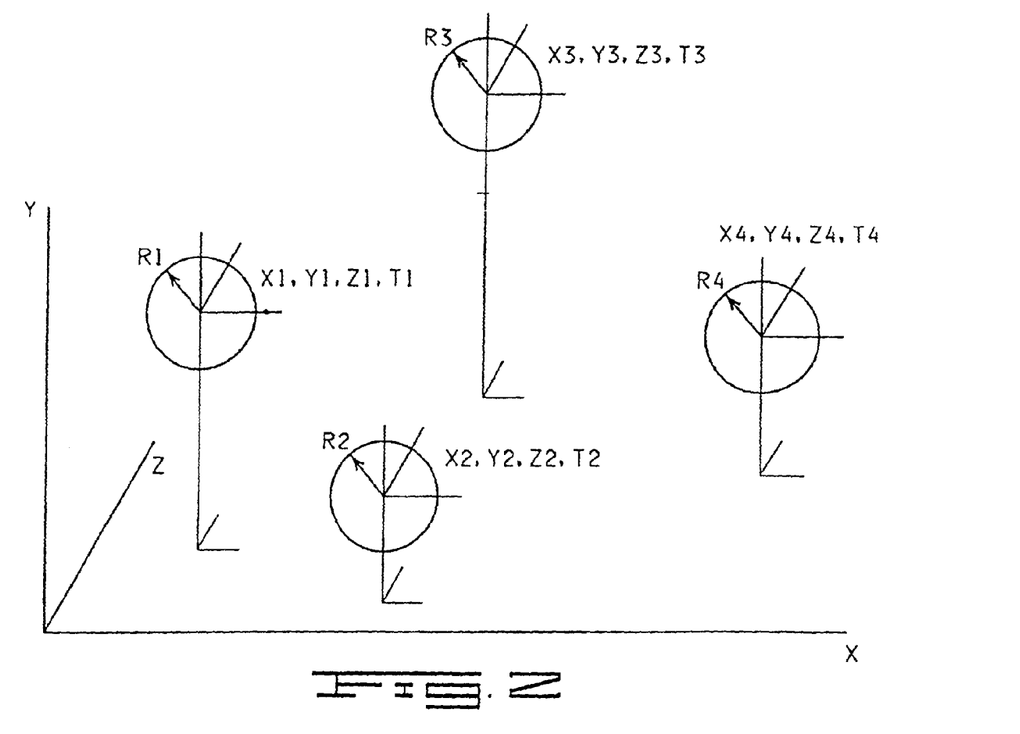
FIG. 2 is a coordinate system illustrating a spatial location identifier and a spatial range identifier utilized by versions of the present invention.

For example, referring to FIG. 2, shown therein is a coordinate system illustrating four spatial location identifiers and four spatial range identifiers selected by different users of the present invention. That is, one of the users selects the spatial location identifier (X1, Y1, Z1), and the spatial range identifier (R1). Another one of the users selects the spatial location identifier (X2, Y2, Z2), and the spatial range identifier (R2).

The user who selected the spatial location identifier (X1, Y1, Z1) and the spatial range identifier R1 will receive weather products and advisories concerning the spatial range identified by the spatial location identifier (X1, Y1, Z1) and the spatial range identifier R1, as predefined in his user input database. The user who selected the spatial location identifier (X2, Y2, Z2) and the spatial range identifier R2 will receive weather products and advisories concerning the spatial range identified by the spatial location identifier (X2, Y2, Z2) and the spatial range identifier R2, and as predefined in the user input database 14. Likewise, the users who selected the spatial location identifiers (X3, Y3, Z3) and (X4, Y4, Z4) and the spatial range identifiers R3 and R4 will receive weather products and advisories concerning the spatial range identified by the spatial location identifiers (X3, Y3, Z3), (X4, Y4, Z4) and the spatial range identifier R3, R4, and as predefined in the user input database 14.

The magnitudes of the spatial range identifiers R1, R2, R3 and R4 can be different or the same. In addition, the magnitudes of the spatial range identifiers R1, R2, R3 and R4 can vary widely and is desirably selected by the users.

Particular users can input the user-defined parameters into the user input database 14 via any suitable method. For example, the user input database 14 is desirably configured to acquire its data from a variety of optional sources preferably chosen by the user, such as verbally through a telephone customer service network, a mobile phone network equipped with wireless application protocol technology, email, a personal digital assistant, a laptop computer, or an interactive web site. Furthermore, users could mail the user-defined parameters to the broadcast network 10 and an individual at the broadcast network 10 could input the user-defined parameters directly into the user input database 14 via a keyboard or other similar input device. In one embodiment, the user inputs the selected information into the user input database 14 via the user's communicator device 11.

The weather information database 21 contains real-time weather data for at least the spatial locations contained in the communicator location database 16 and the spatial locations identified by the spatial location identifier in the user input database 14. The weather analysis unit 12 generates predictions of all weather events based on the real-time weather data. The weather information database 21 desirably receives its real-time weather data from at least one of a plurality of possible resources such as, by way of example but not limitation, government weather information resources, privately operated weather information resources and other various meteorological resources. The real-time weather data could also be either inputted directly at the physical location of the weather information database 21 or inputted via a mobile phone network, a mobile phone network with wireless application protocol, the Internet, aircraft communication systems, email, a personal digital assistant, a laptop computer, regular computer, or other wireless devices.

The communicator location database 16 is an optional feature of the present invention, and is enabled via the signal path 22 when the user requests real-time weather advisories or prediction of events at the dynamic spatial location of the user's communicator device 11. The communicator location database 16 is continuously updated such that the communicator location database 16 contains real-time data indicative of the spatial locations of the communicator devices 11. In one embodiment, the user identifier code in the user's profile is transmitted to the communicator location database 16 via the signal path 22. The communicator location database 16 desirably receives data from the communicator devices 11 identified by the user identifier codes via at least one of a variety of possible resources such as a mobile phone network, a mobile phone network equipped with the wireless application protocol technology, global positioning satellite technology, the Internet, loran technology, radar technology, transponder technology or any other type of technology capable of tracking the spatial location of a communicator device 11 and communicating the location of such communicator device 11 to the communicator location database 16 of the broadcast network 10. Preferably, the communicator location database 16 is continuously and automatically updated as to the location of each of the communicator devices 11, such as by the wireless application protocol technology.

The communication network 20 can be, by way of example but not limitation, a mobile phone network, a mobile phone network with wireless application protocol technology, the Internet, a facsimile network, a satellite network (one or two-way), a RF radio network, or any other means of transmitting information from a source to an end user.

The communicator devices 11 can be bidirectional or unidirectional communicator devices. The communicator devices 11 can be, by way of example but not limitation, a portable device, such as a mobile telephone, a smart phone, a pager, a laptop computer or a personal digital assistant or any other electronic device capable of receiving weather information data. Furthermore, the communicator device 11 can be incorporated into an object that is utilized or accessible by the user, such as a helmet, an automobile, or an airplane, for example. While only three communicator devices 11 are represented in FIG. 1 for purposes of illustration, the interactive weather advisory system 8 contemplates the utilization of a large number of communicator devices 11.

The weather analysis unit 12 receives the data in the user input database 14, the communicator location database 16 and the weather information database 21 from the signal paths 24, 26, and 28. The weather analysis unit 12 can be, by way of example but not limitation, a computer desirably programmed to automatically and continuously compare the data in the user input database 14, communicator location database 16 and weather information database 21 so as to generate an individualized weather output signal including weather information within the spatial range identified by the spatial range identifier for each user-defined parameter in the user input database 14. The weather output signals are transmitted to the communication network 20 via the signal path 32.

The weather analysis unit 12 gathers the real-time weather data from the weather information database 21. The term "real-time weather data", as used herein, refers to weather data which is continually updated so as to indicate current or near current information. In some instances, the "real-time weather data" may be delayed by relatively small increments of five minutes, 15 minutes, or 30 minutes, for example. In other instances, the "real-time weather data" can be provided with substantially no delay. It is expected that the increments will become smaller as communication networks and weather related technology become faster.

The weather analysis unit 12 generates predictions of all weather related events and compares past and current events contained in the weather information database 21 (such as future position, strength, trajectory, etc.), to construct a four-dimensional database. Three dimensions of the database define a physical location on or above the earth's surface (the spatial location identifier (X1, Y1, Z1). The fourth dimension is time; past, present or future (identified as T1, T2, T3, T4). By employing high speed computer processors in real-time, the weather analysis unit 12 compares all events (past, current and predicted), at specific positions (X1, Y1, Z1, T1) with identical user supplied data (the user input database; X1, Y1, Z1, R1, T1), and identifies any matches (weather output signals) to the user through the communication network 20 and communication devices 11.

The communication network 20 receives the weather output signals and the user identification codes via the signal paths 32 and 30. In response thereto the communication network 20 transmits the individualized weather output signals to the communicator devices 11 associated with the user identification codes via the signal paths 34*a*, 34*b* and 34c such that each user receives the individualized weather information that was requested.

The signal paths 34a, 34b and 34c refer to any suitable communication link which permits electronic communications. For example, the signal paths 34a, 34b and 34c can be point-to-point shared and dedicated communications, infra red links, microwave links, telephone links, CATV links, satellite and radio links and fiber optic links.

Various combinations of weather information can be incorporated into the user input database 14 so as to provide the user with selected and specific weather information. For example, a user traveling in his automobile may wish to be informed by the interactive weather advisory system 8 concerning all hailstorms for an area within a 2.5 mile radius of his vehicle as he is traveling from his point of origin to his destination. The user, for example, through his smart phone (communicator device 11) in his vehicle working in conjunction with a mobile phone network (communication network 20) with wireless application protocol, inputs selected information into the user input database 14; namely, the user's smart phone number (user identifier code), hail (weather content identifier), 2.5 mile radius (spatial range identifier 24) and spatial location dynamic (spatial location of the user's smart phone is then automatically and continuously monitored), and the like.

The interactive weather advisory system 8 then monitors weather information and predictions of events in the weather analysis unit 12 and transmits the individualized weather output signal to the user's smart phone if a hailstorm is detected or is highly likely to form within a 2.5 mile radius of the vehicle along the vehicle's path of travel, for the duration of travel.

The individualized weather output signal can be an audio and/or video data signal. For example, the individualized weather output signal can be a .WAV file or other suitable file containing an animated representation of a real or hypothetical individual speaking an individualized message to the user. In the example given above, the individualized message may be that the hailstorm is 2.5 miles ahead of the vehicle and thus, the user should consider stopping for a short period of time so as to avoid the hailstorm. Alternatively, the individualized message may be that the hailstorm is 2.5 miles ahead of the vehicle and thus, the user should consider stopping until further notified by another individualized weather output signal so as to avoid the hailstorm. In other words, the weather analysis unit 12 may transmit another individualized weather output signal to the user via the communication network 20 and the communicator devices 11 notifying the user that the weather condition identified by the weather content identifier has passed or is beyond the spatial location identified by the spatial range identifier.

As another example, a user may desire to be informed of all real-time weather data and predictions of events within a particular spatial range of a particular dynamic spatial location. For instance, the user may be interested in whether his aircraft is at risk of icing as he flies from Oklahoma City to Tulsa, Okla. To provide a suitable level of comfort and safety, the user may wish to be informed of icing conditions within 10 miles of the dynamic spatial location of his aircraft. The user, for example, through his smart phone or other suitable avionic device (communicator device 11) in his aircraft working in conjunction with a mobile phone network (communication network 20) with wireless application protocol, inputs selected information into the user input database 14; namely, the user's smart phone number (user identifier code), icing (weather content identifier), 10 mile radius (spatial range identifier 24) and the spatial location dynamic. The spatial location of the user's smart phone or other suitable avionic device is then automatically and continuously monitored as the aircraft traverses through time and space from (X1, Y1, Z1, T1) to (X4, Y4, Z4, T4). The interactive weather analysis unit 12 then monitors the real-time weather data in the weather information database 21 and the predicted events in the weather analysis unit 12 so as to transmit the individualized weather output signal to the user's smart phone or other avionic device identifying, if icing is detected or is highly likely to form relevant to a 10 mile radius of the aircraft.

As yet another example, perhaps the user is only interested in a particular weather pattern at a particular fixed spatial location and within a particular spatial range irrespective of the immediate location of the communicator device 11. To accomplish this user's request, the broadcast network 10 does not utilize the communicator location database 16. The user inputs selected information into the user input database 14, namely the user's phone number (user identifier code), the code for the particular weather pattern in which the user is interested (weather content identifier), the spatial range around the spatial location in which the user is interested (spatial range identifier) and the spatial location in which the user is interested (spatial location identifier). The weather analysis unit 12 then monitors the real-time weather data in the weather information database 21 and the predicted events in the weather analysis unit 12 so as to transmit the individualized weather information concerning the weather pattern in the spatial location and range requested by the user.

As a further example, perhaps the user is only interested in a particular weather condition at the spatial location and within a particular spatial range at a particular time. The user inputs selected information into the user input database 14, namely, the user's phone number (user identifier code), the code for the particular weather pattern in which the user is interested (weather content identifier), the spatial range around the spatial location in which the user is interested (spatial range identifier and the spatial location in which the user is interested spatial location identifier) and the time and date (time identifier) that the user to wishes to be informed of the weather conditions at the spatial location of interest. In response thereto, the weather analysis unit 12 monitors the real time weather data from the weather information database 21 for the spatial location and range identified by the spatial range identifier and spatial location identifier to determine the probability of the particular weather pattern occurring at the time identified by the time identifier. The weather analysis unit 12 sends, via the signal path 32, the individualized weather output signal to the communication network 20. The communication network 20 receives the user identifier code, via signal path 30, from the user input database 14 and transmits the weather output signal received from the weather analysis unit 12 to the particular communicator device 11 identified by the user identifier code. Thus, the user receives the individualized weather information concerning the spatial location, spatial range and time requested by the user.

The signal paths 22, 24, 26, 28, 30 and 32 can be logical and/or physical links between various software and/or hardware utilized to implement the present invention. It should be understood that each of the signal paths 22, 24, 26, 28, 30 and 32 are shown and described separately herein for the sole purpose of clearly illustrating the information and logic being communicated between the individual components of the present invention. In operation, the signal paths may not be separate signal paths but may be a single signal path. In addition, the various information does not necessarily have to flow between the components of the present invention in the manner shown in FIG. 1. For example, although FIG. 1 illustrates the user identifier code being transmitted directly from the user input database 14 to the communication network 20 via the signal path 30, the user identifier code can be communicated to the weather analysis unit 12 via the signal path 24 and then communicated to the communication network 20 via the signal path 32.

It should be understood that although the user has been described as manually inputting the user identifier code into the user input database 14, the user identifier code could be automatically input into the user input database 14 by the communicator device 11.

Once the user-defined parameters have been input into the user input database 14, the user-defined parameters can be analyzed by the weather analysis unit 12 along with weather content identifiers for purposes of targeted marketing. A plurality of vendors 36 can be provided access to the weather analysis unit 12 of the broadcast network 10 via a plurality of signal paths 38a, 38b, and 38c. The vendors 36 can independently input search information into the weather analysis unit 12 for compiling a data set of information which is useful to the vendors 36.

For example, a particular vendor 36a, who is in the business of selling snow blowers, may input a weather content identifier and time identifier into the weather analysis unit 12 so as to request a list of all spatial locations in the United States which are expected to receive at least 10 inches of snow in the next week. The weather analysis unit 12 would then compile the data set of all spatial locations in United States which is expected to receive at least 10 inches of snow in the next week based on at least one weather content identifier, the time identifier, and the real-time weather data stored in the weather information database 21. The data set is then output to the vendor 36a. Based on the data set, the vendor 36a may send advertisements or additional snow blowers to the areas identified in the data set.

As another example, the particular vendor 36a, who is in the business of selling snow blowers, may input a weather content identifier and time identifier into the weather analysis unit 12 so as to request a list of all user profiles identifying users who resided in spatial locations in the United States which are expected to receive at least 10 inches of snow in the next week. The weather analysis unit 12 would then compile the data set of all spatial locations in United States which is expected to receive at least 10 inches of snow in the next week based on at least one weather content identifier, the time identifier, the user profiles and the real-time weather data stored in the weather information database 21. The data set is then output to the vendor 36a. Based on the data set, the vendor 36a may send advertisements to the users who are identified in the data set.

It is envisioned that users will subscribe to the services provided by the broadcast network 10. In this regard, the broadcast network 10 may or may not charge a service fee to the users. In addition, some services may be provided by the broadcast network 10 for one charge and additional services may be provided at an enhanced charge.

To save processing power, the weather analysis unit 12 may periodically determine which communicator devices 11 are turned off or out of range. Once this has been determined, the weather analysis unit 12 would then not generate any individualized weather output signals for the communicator devices 11 which are turned off or out of range. Once a particular one of the communicator devices 11 is turned on or comes within range, the weather analysis unit 12 would then attempt to generate individualized weather output signals for such communicator devices 11. In other words, to save processing power the weather analysis unit 12 may only generate individualized weather output signals for the communicator devices 11 which are active and within range.

The weather analysis unit 12 can be located at the broadcast network 10. Alternatively, the weather analysis unit 12 can be separate from the remainder of the broadcast network 10 and provided as a service to the broadcast network 10.

From the above description, it is clear that the present invention is well adapted to carry out the objects and to attain the advantages mentioned herein as well as those inherent in the invention. While presently preferred embodiments of the invention have been described for purposes of this disclosure, it will be readily understood that numerous changes may be made which will readily suggest themselves to those skilled in the art and which are accomplished within the spirit of the invention disclosed.

The invention claimed is:

1. A system, comprising:
a communicator location database stored on non-transitory computer readable storage media containing real-time data indicative of a spatial location of a communicator device;
a user input database stored on non-transitory computer readable storage media containing a user profile, the user profile including a user identifier code identifying the communicator device; and
a weather analysis unit including one or more computer processors, the analysis unit configured to:
compare the spatial location of the communicator device with weather forecast data or weather data;
generate an individualized weather output signal based on the comparison of the spatial location of the communicator device with the weather forecast data or the weather data; and
output the individualized weather output signal to a communication network for transmittal to the communicator device.

2. The system of claim 1, wherein the communicator device comprises a bidirectional or unidirectional communicator device, a portable device, a mobile telephone, a smart phone, a pager, a personal digital assistant, a computer, or a laptop computer.

3. The system of claim 1, wherein the communicator location database is updated to contain real-time data indicative of spatial locations of a plurality of communicator devices.

4. The system of claim 3, wherein the communicator location database is automatically updated.

5. The system of claim 3, wherein the communicator location database is automatically and repeatedly updated.

6. The system of claim 3, wherein the communicator location database is configured to repeatedly receive real-time data indicative of the spatial locations of the plurality of communicator devices and the communicator location database is updated to reflect an updated spatial location of one of the plurality of communicator devices.

7. The system of claim 1, wherein the communication network comprises a mobile phone network, the Internet, a facsimile network, a satellite network, or a radio frequency network.

8. The system of claim 1, wherein the individualized weather output signal includes audio.

9. The system of claim 1, wherein the individualized weather output signal includes video.

10. A system, comprising:
a communicator location database stored on non-transitory computer readable storage media containing real-time data indicative of a spatial location of a communicator device;
a user input database stored on non-transitory computer readable storage media containing a user profile, the user profile including a user identifier code identifying the communicator device; and
a weather analysis unit including one or more computer processors, the analysis unit configured to:
output the data indicative of the spatial location of the communicator device with a request to generate an individualized weather output signal based on a comparison of the spatial location of the communicator device with weather forecast data or weather data;
receive the individualized weather output signal based on the comparison of the spatial location of the communicator device with the weather forecast data or the weather data; and
output the individualized weather output signal to a communication network for transmittal to the communicator device.

11. The system of claim 10, wherein the communicator device comprises a bidirectional or unidirectional communicator device, a portable device, a mobile telephone, a smart phone, a pager, a personal digital assistant, a computer, or a laptop computer.

12. The system of claim 10, wherein the communicator location database is updated to contain real-time data indicative of spatial locations of a plurality of communicator devices.

13. The system of claim 12, wherein the communicator location database is automatically updated.

14. The system of claim 12, wherein the communicator location database is automatically and repeatedly updated.

15. The system of claim 12, wherein the communicator location database is configured to repeatedly receive real-time data indicative of the spatial locations of the plurality of communicator devices and the communicator location database is updated to reflect an updated spatial location of one of the plurality of communicator devices.

16. The system of claim 10, wherein the communication network comprises a mobile phone network, the Internet, a facsimile network, a satellite network, or a radio frequency network.

17. The system of claim 10, wherein the individualized weather output signal includes audio.

18. The method of claim 17, wherein the communication network comprises a mobile phone network, the Internet, a facsimile network, a satellite network, or a radio frequency network.

19. The method of claim 17, wherein the individualized weather output signal includes audio.

20. The method of claim 17, wherein the individualized weather output signal includes video.

21. The system of claim 10, wherein the individualized weather output signal includes video.

22. A method outputting an individualized weather output signal, the method comprising:
receiving a user profile, the user profile including a user identifier code identifying a communicator device;
receiving real-time data indicative of a spatial location of the communicator device;
outputting the data indicative of the spatial location of the communicator device with a request to generate an individualized weather output signal based on a comparison of the spatial location of the communicator device with weather forecast data or weather data;
receiving the individualized weather output signal generated based on a comparison of the spatial location of the communicator device with the weather forecast data or weather data; and
outputting the individualized weather output signal to a communication network for transmittal to the communicator device.

23. The method of claim 22, wherein the communicator device comprises a bidirectional or unidirectional communicator device, a portable device, a mobile telephone, a smart phone, a pager, a personal digital assistant, a computer, or a laptop computer.

24. The method of claim 22, further comprising:
storing the real-time data indicative of the spatial location of the communicator device in a communicator location database.

25. The method of claim 24, further comprising:
receiving real-time data indicative of a spatial location of a second communicator device; and
updating the communicator location database.

26. The method of claim 24, wherein the receiving the real-time data indicative of the spatial location of the communicator device comprises repeatedly receiving real-time data indicative of the spatial location of the communicator device, further comprising:
updating the communicator location database to reflect an updated spatial location the communicator device.

* * * * *